(12) United States Patent
Muto et al.

(10) Patent No.: US 8,967,721 B2
(45) Date of Patent: Mar. 3, 2015

(54) HEADREST SUPPORT DEVICE

(75) Inventors: Mitsutaka Muto, Nagoya (JP); Yoshihisa Shibakawa, Nagoya (JP)

(73) Assignee: Sankyo Co., Ltd., Nagoya (JP)

( * ) Notice: Subject to any disclaimer, the term of this patent is extended or adjusted under 35 U.S.C. 154(b) by 191 days.

(21) Appl. No.: 13/499,754

(22) PCT Filed: Sep. 9, 2010

(86) PCT No.: PCT/JP2010/065499
§ 371 (c)(1),
(2), (4) Date: Apr. 2, 2012

(87) PCT Pub. No.: WO2011/043155
PCT Pub. Date: Apr. 14, 2011

(65) Prior Publication Data
US 2012/0200135 A1 Aug. 9, 2012

(30) Foreign Application Priority Data
Oct. 5, 2009 (JP) .................. 2009-231240

(51) Int. Cl.
*B60N 2/48* (2006.01)
(52) U.S. Cl.
CPC ....... *B60N 2/4823* (2013.01); *B60N 2002/4897* (2013.01)
USPC ...................................... 297/410; 297/463.1
(58) Field of Classification Search
USPC .............................. 297/410, 463.1
See application file for complete search history.

(56) References Cited

U.S. PATENT DOCUMENTS

| 7,429,086 B2 * | 9/2008 | Gans .............................. 297/410 |
| 7,434,886 B2 * | 10/2008 | Yamada ........................ 297/410 |

FOREIGN PATENT DOCUMENTS

| DE | 19608851 | 9/1997 |
| JP | 13858/1991 | 2/1991 |

(Continued)

OTHER PUBLICATIONS

Office Action mailed Jan. 7, 2013 in corresponding Japanese Patent Application No. 2009-231240 with English translation (four pages).

(Continued)

*Primary Examiner* — Anthony D Barfield
(74) *Attorney, Agent, or Firm* — Harness, Dickey & Pierce, P.L.C.

(57) ABSTRACT

The disclosed headrest support device is formed with a synthetic thermoplastic resin material as a base, in an effort to reduce overall weight. The headrest support device is provided to the top of the seatback of a seat for a vehicle, holds a headrest that supports the head of a seat occupant, and is such that the height in the vertical direction of the headrest can be adjusted. The headrest support device is caused to comprise two stay guides (1, 1) into which two headrest stays (81, 81) provided to the headrest (8) couple, and which fulfill the role of holding said two headrest stays (81, 81) at a predetermined position; strip-shaped staying-pressing sections (15, 15) that are a portion of each of the tubular sections (11, 11) forming the stay guides (1, 1) and that are formed at a portion in the axial direction of the tubular sections (11, 11); and holding clips (2, 2) that are provided to the place on the tubular sections containing the staying-pressing sections (15, 15) and that move so as to press said staying-pressing sections (15, 15) towards the inner surface.

2 Claims, 4 Drawing Sheets

(56) References Cited

FOREIGN PATENT DOCUMENTS

| | | |
|---|---|---|
| JP | U-3-13858 | 2/1991 |
| JP | 11-089665 A | 4/1999 |
| JP | 11-198703 A | 7/1999 |
| JP | 2004-298498 A | 10/2004 |
| JP | 2006-198226 A | 8/2006 |
| JP | 2008-093364 A | 4/2008 |
| JP | 2009-106621 A | 5/2009 |
| JP | 2009-112524 A | 5/2009 |
| JP | 2009-125398 A | 6/2009 |

OTHER PUBLICATIONS

International Search Report (in Japanese with English translation) for PCT/JP2010/065499, mailed Nov. 9, 2010; ISA/JP.

* cited by examiner

HEADREST SUPPORT DEVICE

CROSS-REFERENCE TO RELATED APPLICATIONS

This application is a 371 U.S. National Stage of International Application No. PCT/JP2010/065499, filed Sep. 9, 2010, and claims priority to Japanese Patent Application No. 2009-231240, filed Oct. 5, 2009, the disclosures of which are herein incorporated by reference in their entirety.

TECHNICAL FIELD

The present invention relates to a headrest support device for adjusting a headrest mounted on a seat for a vehicle to a suitable vertical height, and fixing the headrest at this vertical height.

BACKGROUND ART

A conventional headrest support device of the above-mentioned kind is disclosed, for example, in JP-A-2006-198226.

CITATION LIST

Patent Literature

PTL 1: JP-A-2006-198226

SUMMARY OF THE INVENTION

Technical Problem

By the way, with respect to the above-mentioned conventional headrest support device (as the prior art), injection molding measures carried on by inserting a predetermined plastic material into cylindrical dies has been adopted as the manufacturing process. Further, on the occasion of a mold release, the molded body member which has been formed by the injection molding measures is pulled, in force, from the cylindrical molding dies, in its axial direction. As a result, sagging could be caused, in particular, in a curved part provided for generating a resilient reaction force, and accordingly, there would be caused the problem that the generation of a sufficiently high resilient reaction force is difficult in its entirety. In order to solve the above-mentioned problems, an object (task) of the present invention is to provide a headrest support device having a configuration with no curved part as stated above.

Solution to Problem

To solve the problem, according to the present invention, there is taken the following measures: that is, in the first aspect of the present invention as stated in appended claim 1, there is provides a headrest support device which is provided in the top part of the seatback of a seat for a vehicle, for holding a headrest for bearing the head of an occupant, and which is capable of adjusting the vertical height of the headrest, the headrest support device including a headrest stay holding mechanism for holding the headrest, the headrest holding mechanism comprising: stay guides adapted to be fitted therein with headrest stays provided to the headrest and having a role for holding these headrest stays at a predetermined position, stay pressing parts which are formed in a strip-like shape along the axial direction thereof, and which are located respectively in parts of cylindrical portions which constitute the stay guides, holding clips provided in zones of the cylindrical portions which include the stay pressing parts, respectively, and acting upon the stay pressing parts so as to press the stay pressing parts toward the inner surface side.

Next, according to a second aspect of the present invention as stated in appended claim 2, there is provided a headrest support device as stated in appended claim 1, having recess grooves formed respectively in the outer peripheral parts of the cylindrical portions which constitute the above-mentioned stay guides, and as well, in the stay pressing parts which constitutes parts of the cylindrical parts, in a substantially longitudinal center region thereof, the recess grooves being adapted to be engaged with the holding grips.

Next, according to a third aspect of the present invention as stated in claim 3, there is provided a headrest support device as stated in claim 1 or 2, having the stay guides which are made of a predetermined thermoplastic synthetic resin material, and the holding clips which are formed in a C-like shape and which are made of iron group metal materials.

Advantageous Effects of Invention

Explanation will be made of the first aspect of the present invention stated in claim 1. With the present invention having the configuration as stated above, the stay pressing parts which are formed respectively in the parts of the cylindrical stay guides, coaxially with the stay guides, are extended, in its entirely, along the headrest stays, and are capable of holding the stay guides under pressure over a long longitudinal length of the latter. Further, the holding clips for acting upon the stay pressing parts so as to press the latter, inward thereof, are provided in the longitudinal center parts of the stay pressing parts. Therefore, according to the action by the holding clips, the stay pressing parts are always urged toward the headrest stay, and accordingly, it is possible to effectively suppress abnormal noises which are possibly caused around the headrest stays and the stay guides when vibrations are propagated around the headrest support device.

Further, according to the second aspect of the present invention stated in appended claim 2, each of the above-mentioned holding clips has an ark-like shape of ¾ circle in a plan view, and accordingly, the holding clip having the arc-like shape as stated above, is arranged so as to be fitted in the recess groove formed in the associated stay guide or the like. Thus, the associated strip-like stay pressing part is more firmly pressed against the outer surface of the associated stay by the fastening force of the holding grip. Incidentally, the conventional one has caused the problem that the contact part of the stay pressing part is deformed due to creep after the long time use, and a result, some play or the like is caused between the stay guide and the headrest stay. On the contrary to the prior art, according to the present invention, the stay pressing part is always urged against the headrest stay by the resilient force of the holding clip, so as to allow the vertical motion of the headrest to become always smooth. Further, it is possible to suppress the generation of abnormal noises from the stay guide which holds the headrest stay, and so forth.

Further, according to the third aspect of the present invention stated in appended claim 3, the stay guide including the above-mentioned stay pressing part is made of a predetermined thermoplastic synthetic resin such as PP (polypropylene) while the holding clip which is provided to the above-mentioned stay pressing part is formed of an iron group metal material such as a piano wire (SWP-B), and accordingly, it is possible to firmly exhibit a fastening force. As a result, when vibration is propagated to the headrest stay device, it is possible to effectively suppress the generation of abnormal noises from the headrest stay therearound.

DESCRIPTION OF EMBODIMENTS

Figure 1:
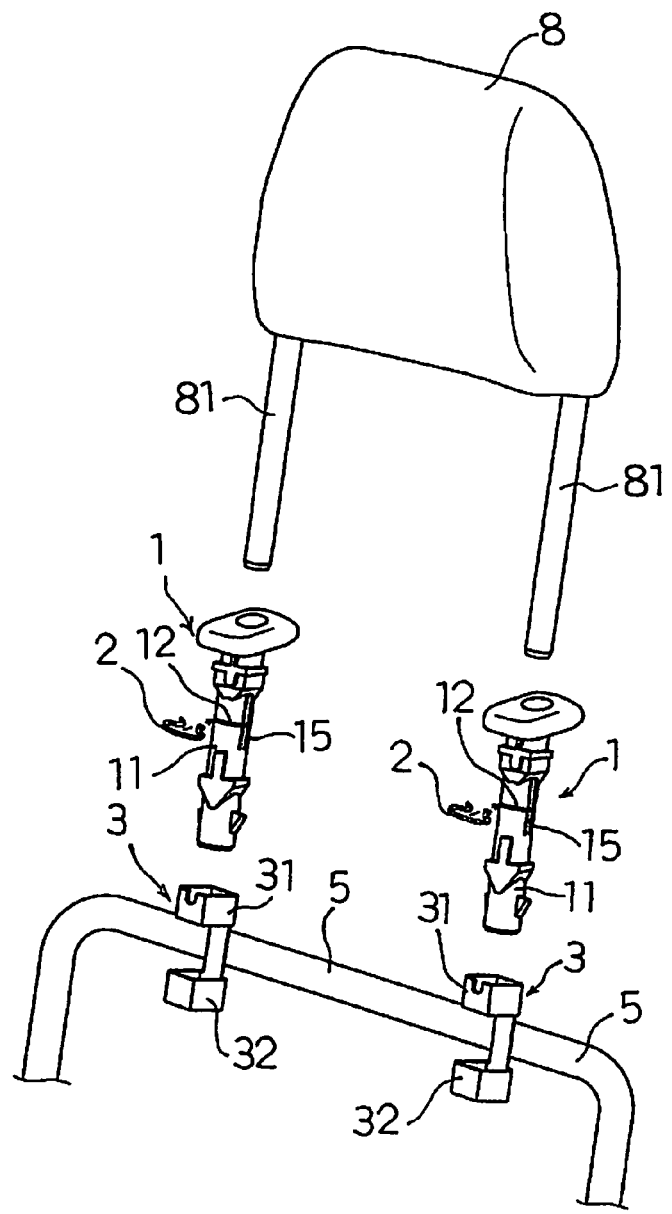
FIG. 1 is an exploded perspective view illustrating an entire configuration of the present invention.

Explanation will be hereinbelow made of an embodiment according to the present invention with reference to FIGS. 1 to 5. This embodiment relates to a headrest support device which is adapted to be mounted on the top part of the seatback of a seat for a vehicle, for holing a headrest adapted to bear thereon the head of an occupant, and which is capable of adjusting the vertical height of the headrest. The specific configuration of the headrest support device will be explained with reference to FIG. 1. That is, the headrest support device is mainly composed of two stay guides 1, 1 adapted to be respectively fitted thereinto with two headrest stays 81, 81 provided to a headrest 8, and having a role for holing the two headrest stays 81, 81 at a predetermined position, strip-like stay pressing parts 15, 15 formed respectively in parts of cylindrical portions 11, 11 which constitute respectively the above-mentioned stay guides 1, 1, along the axial direction of the cylindrical portions, and holding clips 2, 2 which are provided respectively to zones in the cylindrical portions which include the stay pressing parts 15, 15, and which act upon the stay pressing parts 15, 15 so as to urge the stay pressing parts toward the inner surface side. It is noted that the holding clips 2, 2 have a C-like shape in a plan view, as shown, for example, in FIG. 4. Thus, the holding clips will be referred to as "C clips 2, 2" in this embodiment.

Figure 2:
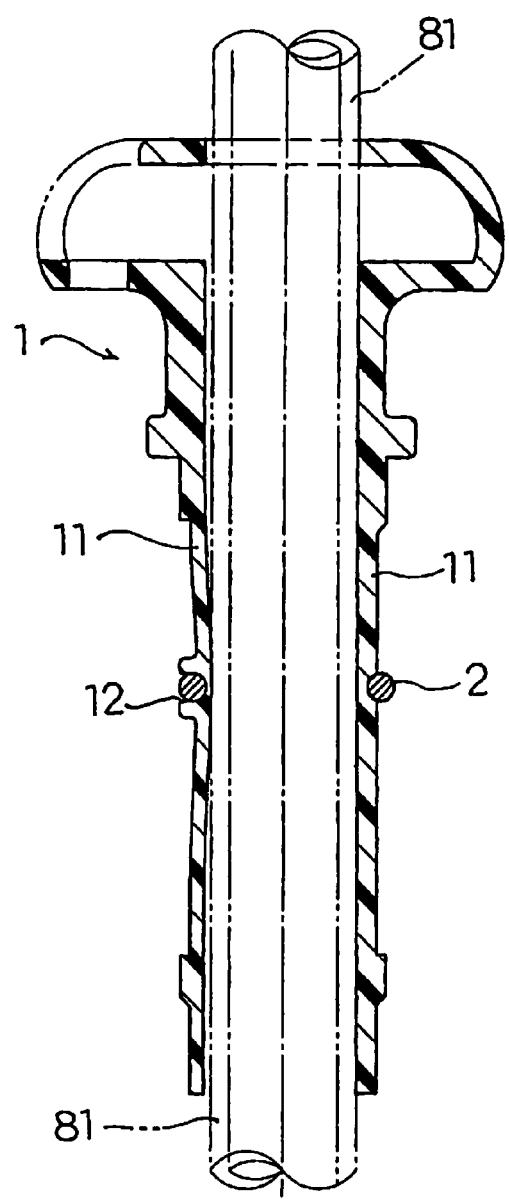
FIG. 2 is a longitudinal sectional view which shows a relationship (coupled condition) between a stay guide that constitutes a main portion of the present invention, and a holding clip fitted into the latter.
Figure 3:
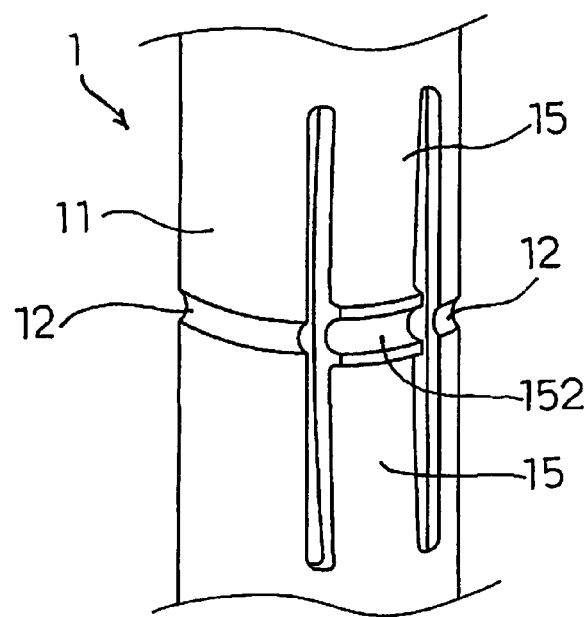
FIG. 3 is a stereographic perspective view which shows a condition that a holding clip having a C-like shape in a plan view is fitted in recess grooves formed in a stay guide.
Figure 4:
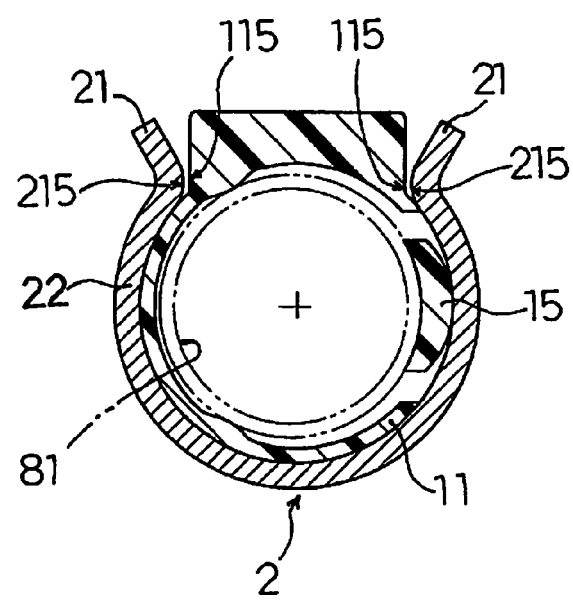
FIG. 4 is a cross-sectional view which shows the condition that the holding clip having the C-like shape is fitted in the recess groove of the stay guide.
Figure 5:
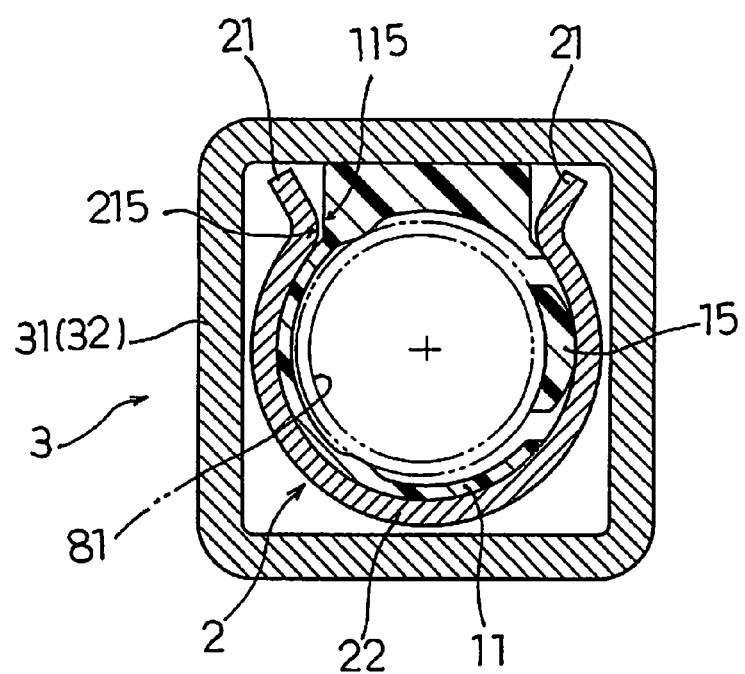
FIG. 5 is a cross-sectional view which shows the condition that a headrest stay is held in a holder provided on a seat frame through the intermediary of a holding clip.

Next, in the basic configuration as stated above, the specific configuration of the cylindrical shape stay guide 1 will be hereinbelow explained. Referring to FIGS. 1, 2 and 3, the stay guide 1 is made of a thermoplastic synthetic resin material such as polypropylene resin (PP) by molding and forming the thermoplastic synthetic resin as a base, into a cylindrical shape. The stay guide 1 having the cylindrical shape, is provided in a part of the outer peripheral surface thereof with a stay pressing part 15 formed in a strip-like shape, in the axial direction of the stay guide 1, as shown, for example, in FIG. 3. It is noted that the strip-like stay pressing part 15 is integrally connected at its both terminal end parts to the cylindrical portion 11 therearound. Further, the strip-like stay pressing 15 is formed in a substantially longitudinal center part thereof with a recess groove 152, and the cylindrical stay guide 1 which is formed so as to hold the strip-like stay pressing part 15, is formed in the outer peripheral part thereof with a recess groove 12. Moreover, the holding clip having a ¾ circle shape, that is, the C clip 2 is adapted to be fitted in these recess grooves 152, 12, as shown in FIGS. 4 and 5.

The above-mentioned C clip has an ohm (Ω☐-like shape in a plan view and is made of a wire material such as a piano wire (SWP-B), that is, such the wire material is worked by bending so as to be formed into a predetermined shape. Specifically, as shown in FIG. 4, the C clip 2 is basically composed of a ring part 22 which is formed so as to have a ¾ circle-like arc length, and guide parts 21 which are continuous respectively to both terminal ends of the ring part 22 and which are opened in a Japanese letter "ハ" shape.

With the above-mentioned configuration, the C clip 2 is fitted with its ring part 22 in the recess grooves 12 formed in the stay guide 1, and further, and is fitted in the recess groove 152 formed in the stay pressing part 15 so as to inwardly press the stay pressing part 15, that is, the C clip 2 acts upon the stay pressing part 15 which is therefore pressed against the outer periphery of the headrest stay 81. Accordingly, it is possible to hold the headrest stays 81, 81 at a predetermined position, and it is also possible to prevent abnormal noises and so forth from being generated from the stay guides 1, 1, therearound, which hold the headrest stays 81, 81.

When fitting the C clip 2 having the above-mentioned configuration, the C clip 2 is first pressed so that it is fitted with its guide parts 21, 21 which are formed at both terminal end parts of the C clip 2 and which are opened in the diverging wave-like shape, into the recess groove 152 formed in the stay pressing part 15, and it is then fitted into the recess groove 12 formed in the stay guide 1 in order to tack the C-clip to the stay guide 1. In this situation, the above-mentioned C clip 2 is pressed to be fitted with its ring part 22 into the recess grooves 12 formed in the stay guide 1, and then to be fitted into the recess groove 152 formed in the stay pressing part 15. Further, at this stage, the above-mentioned guide parts 21, 21 are caused to abut, with their joint parts 215, 215, against holding parts 115, 115 formed in a part of the cylindrical portion 11 which is provided in the stay guide 1, as shown in FIG. 4. Thus, the C clip 2 is securely attached to the outer peripheral surface of the stay guide 1, and accordingly, the stay pressing part 15 is surely pressed from the outside to the inner peripheral surface thereof. Further, hereby, the C clip 2 can be surely positioned in the circumferential direction.

As a result, the urging force of the stay pressing part 15 against the outer peripheral surface of the headrest stay 81 can be surely maintained. Thus, the headrest 8 can be smoothly adjusted in the heightwise direction thereof. Further, in this embodiment, with the above-mentioned configuration, it is possible to effectively suppress abnormal noises such as rattling sounds which are generated from the above-mentioned headrest stays 81, 81 therearound, when vibration is propagated into the head rest device.

Further, the stay guides 1, 1 having the above-mentioned configuration, are adapted to be fitted in hollow holders 3 provided in the top part of the seat frame 5, as shown in FIG. 1. Each of these hollow holders 3 has, for example, a square cross-sectional shape as shown in FIG. 5, and the square cross-sectional shape holder 3 is provided, being bi-split into an upper and a lower parts. That is, the holder 3 is composed of, for example, an upper holder 31 and a lower holder 32 as shown in FIG. 1, and accordingly, it is possible to aim at making the holder 3 lightweight. Further, since the stay guide 1 can be held at two positions in the vertical direction as above described, the stay guide 1 can be surely held.

The invention claimed is:

1. A headrest support device adapted to be provided in a top part of a seat back of a seat for a vehicle, for holding a headrest which is intended to bear thereon a head of an occupant, the headrest support device being capable of adjusting a vertical height of the headrest, the headrest support device comprising:
- a headrest stay holding mechanism for holding the headrest, the headrest stay holding mechanism including:
  - a stay guide adapted to be fitted with a headrest stay provided to the headrest, and having a role for holding the headrest stay at a predetermined position, wherein the stay guide has a cylindrical body and is made of a thermoplastic synthetic resin material, the stay guide includes a strip-like stay pressing part formed along a longitudinal axis of the cylindrical body, and
  - a holding clip disposed around a portion of the stay guide which includes the strip-like stay pressing part, the holding clip is configured to apply a compressive force upon the strip-like stay pressing part, and the holding clip is made of a metallic material, wherein the stay guide has a holding part that protrudes from an outer peripheral surface of the cylindrical body and defines a recess groove that circumferentially extends around an outer surface of the cylindrical body and passes a longitudinal center of the strip-like stay pressing part, and the holding clip is disposed in the recess groove, the holding clip has a "Ω"-like shape and includes a ring part that substantially has a ¾ circle-like arc length with two guide parts extending from respective ends of the ring part to form two joint parts between the ring and the guide parts, and the guide parts protrude outward away from a center of the holding clip and define a Japanese letter "ハ" shape opening, and the joint parts abut against the holding part of the stay guide.

2. The headrest support device of claim 1 wherein the strip-like stay pressing part is formed at a central portion of the cylindrical body of the stay guide.

\* \* \* \* \*